United States Patent [19]

Dhillon

[11] 3,876,857

[45] Apr. 8, 1975

[54] SOLDERING PEN FOR MICROCIRCUIT PRODUCTION

[75] Inventor: Tejinder Singh Dhillon, Toronto, Ontario, Canada

[73] Assignee: The Raymond Lee Organization, Inc., New York, N.Y.

[22] Filed: June 29, 1973

[21] Appl. No.: 375,030

[52] U.S. Cl. ............... 219/230; 219/236; 219/421; 222/146 HE; 228/53; 401/2
[51] Int. Cl. ..................... H05b 1/00; B23k 3/06
[58] Field of Search ................ 219/221, 227–240, 219/421; 401/1, 2, 260; 228/51–55; 222/146 R, 146 HE

[56] References Cited
UNITED STATES PATENTS

| 801,193 | 10/1905 | Howard et al. | 228/52 |
|---|---|---|---|
| 1,006,543 | 10/1911 | Funk | 228/53 |
| 1,701,894 | 2/1929 | McCue | 228/52 X |
| 2,272,780 | 2/1942 | Schweyer | 401/2 |
| 2,576,393 | 11/1951 | Flanagan | 219/230 X |
| 3,172,383 | 3/1965 | Emanus | 219/230 X |

FOREIGN PATENTS OR APPLICATIONS

| 427,522 | 11/1947 | Italy | 219/230 |
|---|---|---|---|
| 422,354 | 6/1947 | Italy | 219/230 |

*Primary Examiner*—A. Bartis
*Attorney, Agent, or Firm*—Daniel Jay Tick

[57] ABSTRACT

A soldering pen for microcircuit production comprises an outer tube of substantially hollow cylindrical configuration having a predetermined diameter and length. An inner tube of substantially hollow cylindrical configuration is coaxially positioned in the outer tube in spaced relation therewith and has a diameter smaller than that of the outer tube and a length shorter than that of the outer tube. Both tubes are open at one end. A substantially conical cover is provided over both tubes at the one end thereof. The cover has an aperture formed therethrough at the apex thereof. A heating element is provided in the inner tube and a substantially conical bit in the tube has a pen point extending coaxially through the aperture through the cover. Soldering metal is provided in the space between the inner and outer tubes. A spring is provided between the inner and outer tubes urging the inner tube in a direction urging the pen point out of the cover. Thus, when the pen point is pressed against a surface, the inner tube is forced back into the outer tube against the action of the spring and enlarges the uncovered area of the aperture through the cover thereby permitting molten solder to pass through the aperture onto the pen point.

3 Claims, 3 Drawing Figures

SOLDERING PEN FOR MICROCIRCUIT PRODUCTION

DESCRIPTION OF THE INVENTION

The present invention relates to a soldering pen. More particularly, the invention relates to a soldering pen for microcircuit production.

Objects of the invention are to provide a soldering pen of simple structure which is efficient, effective, reliable and economical in use, is simple, easy, convenient and facile to use, is of light weight, carries a large supply of solder sufficient for long use, may be utilized with one hand, is especially applicable for microcircuit production and may be used for tin soldering.

In order that the invention may be readily carried into effect, it will now be described with reference to the accompanying drawing, wherein FIG. 1 is a schematic diagram of an embodiment of the soldering pen of the invention in use;

In the FIGS., the same components are identified by the same reference numerals.

Figure 1:
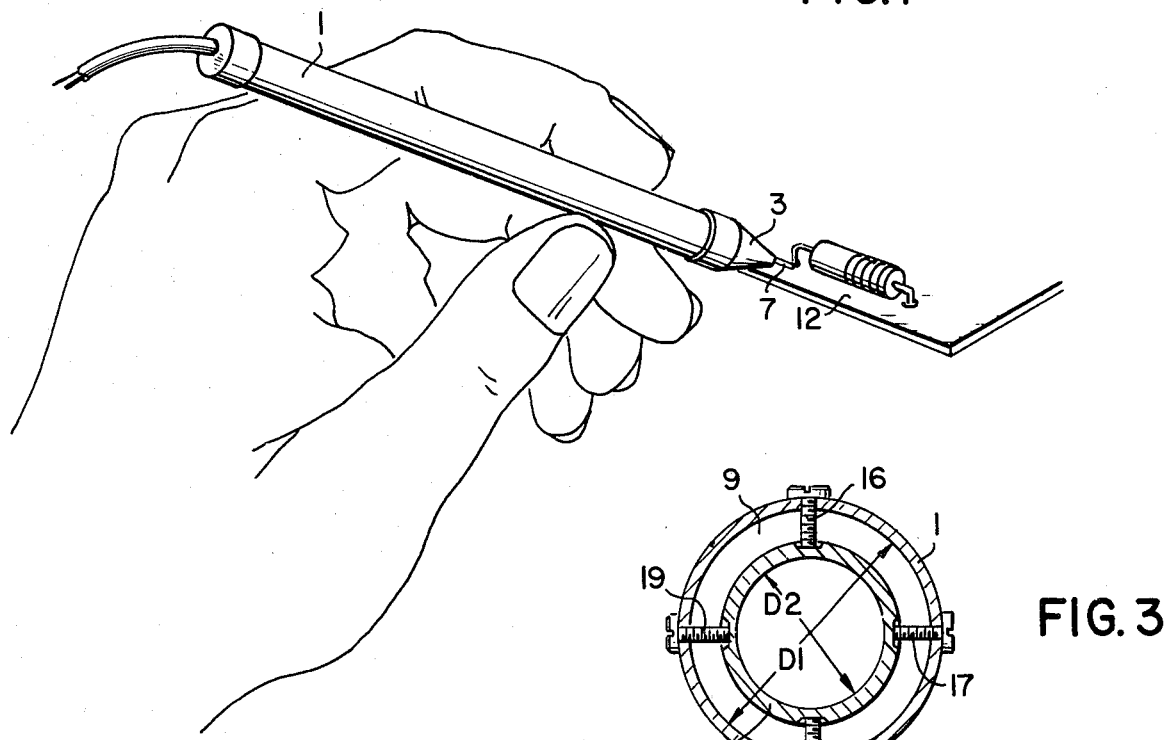

The soldering pen of the invention comprises an outer tube 1 (FIGS. 1, 2 and 3) of substantially hollow cylindrical configuration having a predetermined diameter D1 (FIG. 3) and length.

An inner tube 2 (FIGS. 2 and 3) of substantially hollow cylindrical configuration is coaxially positioned in the outer tube 1 in spaced relation therewith and has a diameter D2 (FIG. 3) smaller than that of the outer tube and a length shorter than that of the outer tube. Both tubes 1 and 2 are open at one end, at the right of FIG. 2.

Figure 2:
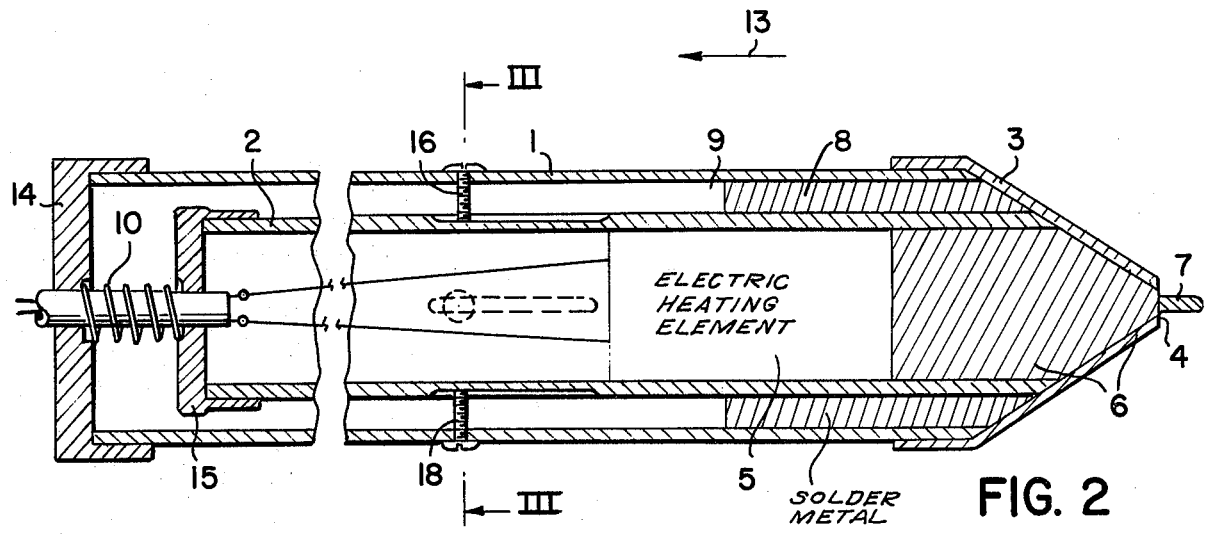
FIG. 2 is a longitudinal sectional view of the soldering pen of the invention.

A substantially conical cover 3 (FIGS. 1 and 2) is provided over both tubes 1 and 2 at the one end thereof. The cover 3 has an aperture 4 formed therethrough at the apex thereof (FIG. 2).

A heating element 5 (FIG. 2) is provided in the inner tube 2. A substantially conical bit 6 (FIG. 2) is also provided in the inner tube and has a pen point 7 (FIGS. 1 and 2) extending coaxially through the aperture 4 through the cover 3.

Soldering metal 8 is provided in the space 9 (FIGS. 2 and 3) between the inner and outer tubes 2 and 1.

A spring 10 (FIG. 2) is positioned between the inner and outer tubes 2 and 1 and urges the inner tube in a direction, indicated by an arrow 11, urging the pen point 7 out of the cover 3. Thus, when the pen point 7 is pressed against a surface 12 (FIG. 1), the inner tube 2 is forced back into the outer tube 1, in the direction of an arrow 13, against the action of the spring 10, and enlarges the uncovered area of the aperture 4 through the cover 4, thereby permitting molten solder from the space 9 to pass through the aperture onto the pen point.

The other end of each of the inner and outer tubes 2 and 1, at the left of FIG. 2, is open. A cap 14 covers the other end of the outer tube 1 (FIG. 2). A cap 15 covers the other end of the inner tube 2 (FIG. 2). The spring 10 is coaxially positioned between the caps 15 and 14 of the inner and outer tubes 2 and 1, respectively.

The conical cover 3 is removably affixed to the one end of the outer tube 1.

Figure 3:
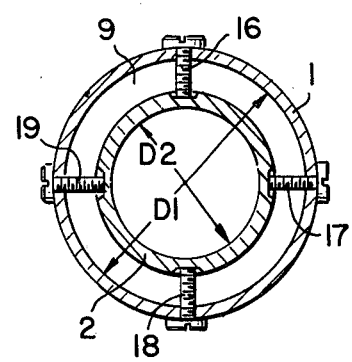
FIG. 3 is a cross-sectional view, taken along the lines III—III, of FIG. 2.

Each of a plurality of screws 16, 17, 18 and 19 (FIG. 3) is threadedly affixed to the outer tube 1 and passes through the outer tube in a radial direction. Each of the screws 16, 17, 18 and 19 abuts the inner tube 2 thereby maintaining the inner tube in spaced coaxial position within the outer tube 1, as shown in FIGS. 2 and 3.

While the invention has been described by means of a specific example and in a specific embodiment, I do not wish to be limited thereto, for obvious modifications will occur to those skilled in the art without departing from the spirit and scope of the invention.

I claim:

1. A soldering pen for microcircuit production, said soldering pen comprising an outer tube of substantially hollow cylindrical configuration having a predetermined diameter and length;

an inner tube of substantially hollow cylindrical configuration coaxially positioned in the outer tube in radially spaced relation therewith and having a diameter smaller than that of the outer tube and a length shorter than that of the outer tube, both tubes being open at both ends, said inner tube being supported within said outer tube for axial movement relative thereto;

a substantially conical cover over both tubes at one end thereof, said cover being secured to said outer tube and having an aperture formed therethrough at the apex thereof;

an electric heating element in the inner tube and a substantially conical bit at the one end of the inner tube and having a pen point extending coaxially through the aperture through the cover;

power supply means extending from the other end of the inner tube and outwardly through the other end of the outer tube for energizing the heating element;

soldering metal in the space between the inner and outer tubes;

a cap on the inner tube covering the other end thereof;

a cap on the outer tube covering the other end thereof; and spring means coaxially positioned between and engaging the caps of the inner and outer tubes urging the inner tube in a direction urging the conical bit into engagement with the conical cover to close the aperture with the pen point extending out of the cover whereby when the pen point is pressed against a surface the inner tube is forced back into the outer tube against the action of the spring and enlarges the uncovered area of the aperture through the cover thereby permitting molten solder to pass through the aperture onto the pen point.

2. A soldering pen as claimed in claim 1, wherein the conical cover is removably affixed to the one end of the outer tube.

3. A soldering pen as claimed in claim 2, further comprising a plurality of screws each threadedly affixed to the outer tube and passing through the outer tube in a radial direction and slidably abutting the inner tube thereby maintaining the inner tube in spaced coaxial position within the outer tube.

* * * * *